US012634304B2

(12) United States Patent
Chagas et al.

(10) Patent No.: US 12,634,304 B2
(45) Date of Patent: May 19, 2026

(54) DIGITAL TWINS FOR MONITORING SERVER ATTACKS IN FEDERATED LEARNING ENVIRONMENTS

(71) Applicant: Dell Products L.P., Round Rock, TX (US)

(72) Inventors: Eduarda Tatiane Caetano Chagas, Belo Horizonte (BR); Maira Beatriz Hernandez Moran, Rio de Janeiro (BR); Paulo Abelha Ferreira, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 172 days.

(21) Appl. No.: 18/491,903

(22) Filed: Oct. 23, 2023

(65) Prior Publication Data

US 2025/0133094 A1     Apr. 24, 2025

(51) Int. Cl.
*H04L 9/40* (2022.01)
*G06N 3/098* (2023.01)

(52) U.S. Cl.
CPC ......... *H04L 63/1416* (2013.01); *G06N 3/098* (2023.01)

(58) Field of Classification Search
CPC .......................... H04L 63/1416; G06N 3/098
USPC .......................................................... 726/23
See application file for complete search history.

(56) References Cited

U.S. PATENT DOCUMENTS

| | | | | |
|---|---|---|---|---|
| 11,853,391 | B1 * | 12/2023 | Ladkat .................... | G06N 3/063 |
| 2017/0109322 | A1 * | 4/2017 | McMahan .............. | G06N 20/00 |
| 2020/0004801 | A1 * | 1/2020 | McMahan ............... | G06F 17/11 |
| 2022/0394629 | A1 * | 12/2022 | Lau ....................... | H04W 52/16 |
| 2023/0325529 | A1 * | 10/2023 | Sav ...................... | G06F 21/6245 |
| | | | | 726/26 |
| 2023/0342599 | A1 * | 10/2023 | Vargaftik ................. | G06N 3/08 |
| 2024/0054387 | A1 * | 2/2024 | Bai ........................ | H04W 72/25 |
| 2024/0152649 | A1 * | 5/2024 | Kao ..................... | G06F 21/6245 |
| 2024/0171991 | A1 * | 5/2024 | Marzban ................. | H04L 41/16 |
| 2024/0224064 | A1 * | 7/2024 | Marzban .................. | G06N 3/08 |
| 2025/0150134 | A1 * | 5/2025 | Hao ....................... | H04W 24/08 |

FOREIGN PATENT DOCUMENTS

| | | | | | |
|---|---|---|---|---|---|
| CN | 113139662 | A | * | 7/2021 | ............. G06N 20/00 |
| CN | 114338045 | A | * | 4/2022 | |
| CN | 116647388 | A | * | 8/2023 | ......... H04L 63/1416 |

(Continued)

OTHER PUBLICATIONS

McMahan, et al., Federated learning of deep networks using model averaging, arXiv preprint arXiv: 1602.05629, pp. 15-18 (2016) (Year: 2016).*

(Continued)

*Primary Examiner* — David P Zarka
(74) *Attorney, Agent, or Firm* — Workman Nydegger

(57) ABSTRACT

A digital twin is intertwined with a central server and configured to generate acceptability distributions based on updates received from clients at the server in the federated learning system. The acceptability distributions, which may account for the probability of transmission failures, are used to identify anomalous behaviors, including anomalies in global gradient updates, server attacks and/or suspicious behavior.

20 Claims, 7 Drawing Sheets

Federated Learning System 100

Client (Edge Device or Node) 102

Server 104

Digital Twin 106

Anomaly Detection Module 112

Remote Monitoring Module 114

Local Model 108

Global Model 110

(56) References Cited

FOREIGN PATENT DOCUMENTS

CN          117421590 A  *  1/2024  ...........  G06F 18/214

OTHER PUBLICATIONS

Sun et al., Adaptive federated learning and digital twin for industrial internet of things, IEEE Transactions on Industrial Informatics, pp. 5605-5614 (2020) (Year: 2020).*

Lu et al., Communication-efficient federated learning and permissioned blockchain for digital twin edge networks, IEEE Internet of Things Journal, pp. 2276-2288 (2020) (Year: 2020).*

Rodríguez-Barroso, Nuria, et al. "Survey on federated learning threats: concepts, taxonomy on attacks and defences, experimental study and challenges" arXiv:2201.08135v1 [cs.CR] Jan. 20, 2022.

Sun, Wen, et al. "Adaptive federated learning and digital twin for industrial internet of things"; arXiv:2010.13058v2 [cs.LG] Nov. 1, 2020.

Liu, Kangde, et al. "A survey on blockchain-enabled federated learning and its prospects with digital twin." Digital Communications and Networks (2022).

Jamil, Sonain, MuhibUr Rahman, and Muhammad Sohail Abbas. "Resource Allocation Using Reconfigurable Intelligent Surface (RIS)-Assisted Wireless Networks in Industry 5.0 Scenario." Telecom. vol. 3. No. 1. MDPI, 2022.

Jamil, Sonain, and MuhibUr Rahman. "A Comprehensive Survey of Digital Twins and Federated Learning for Industrial Internet of Things (IIoT), Internet of Vehicles (IoV) and Internet of Drones (IoD)." Applied System Innovation 5.3 (2022).

Lu, Yunlong, et al. "Communication-efficient federated learning and permissioned blockchain for digital twin edge networks." IEEE Internet of Things Journal 8.4 (2020): 2276-2288.

McMahan, H. B., et al. "Federated learning of deep networks using model averaging. CoRR abs/1602.05629." arXiv preprint arXiv:1602.05629 (2016).

* cited by examiner

DIGITAL TWINS FOR MONITORING SERVER ATTACKS IN FEDERATED LEARNING ENVIRONMENTS

FIELD OF THE INVENTION

Embodiments of the present invention generally relate to monitoring computing systems. More particularly, at least some embodiments of the invention relate to systems, hardware, software, computer-readable media, and methods for monitoring and/or protecting a federated learning system from attacks including server attacks.

BACKGROUND

Federated learning environments typically include a central server that cooperates with multiple clients, which may be distributed across one or more networks. When the central server is compromised, the central server may act in a malicious manner. This is very dangerous at least because the central server has privileged information about the clients, the models running locally on the clients, and the process of aggregating updates received from the clients. A compromised server can, in effect, poison or otherwise compromise the operation of the models operating at the clients and compromise the federated learning process.

Server attacks are concerning at least because monitoring servers in real-time is complicated and requires a substantial amount of computational resources and energy. Further, the ability to monitor an aggregated update in a federated learning process is challenging when the server is untrusted.

Blockchain technology has been proposed as a monitoring mechanism for federation clients. In this example, the clients submit updates to their local models to miners. Using the consensus mechanism of blockchain systems, the updates are aggregated and the final model is validated prior to attaching the final model to the blockchain. However, this approach is energy intensive and is not necessarily performed in real time in light of the consensus mechanism.

More specifically, defending against server attacks based on blockchain technologies is energy intensive because this approach needs more elements to build a decentralized peer-to-peer chain-structured architecture. One of the most popular consensus mechanisms for blockchain is proof of work (PoW), which demands large amounts of energy. A PoW mining processes includes solving a hard cryptographic puzzle by brute-force, which demands significant computing resources, in order to determine accounting rights and rewards. This energy-consuming approach is not compatible the sustainable and environment-friendly trends for current technology development.

Server attacks in federated learning systems are often performed with a focus on (i) capturing information during data transmission on the network, (ii) participating in the federation as a malicious client, or (iii) infecting the server. With privileged access to the server, the attacker will have information about the model used, the gradient aggregation method, updates of the local models and the global model obtained at the end of each training round.

Several types of damage can be orchestrated when access to the model, the data, or the system is maliciously achieved. For example, model inversion attacks extract information about the data used during training of the model. Association inference attacks check if a given sample is present in the training database of a federation client. Model poisoning attacks may make malicious changes to the gradients of models with the aim of degrading the models or training the models for a specific malicious goal.

Another problem associated with server attacks in federated learning systems relates to the fact that the ability to learn or understand a robust aggregated update is challenging. Due to the great heterogeneity of data in such scenarios, as well as the complexity of the robust aggregation process, differentiating legitimate updates obtained through robust aggregation from malicious updates is very challenging.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
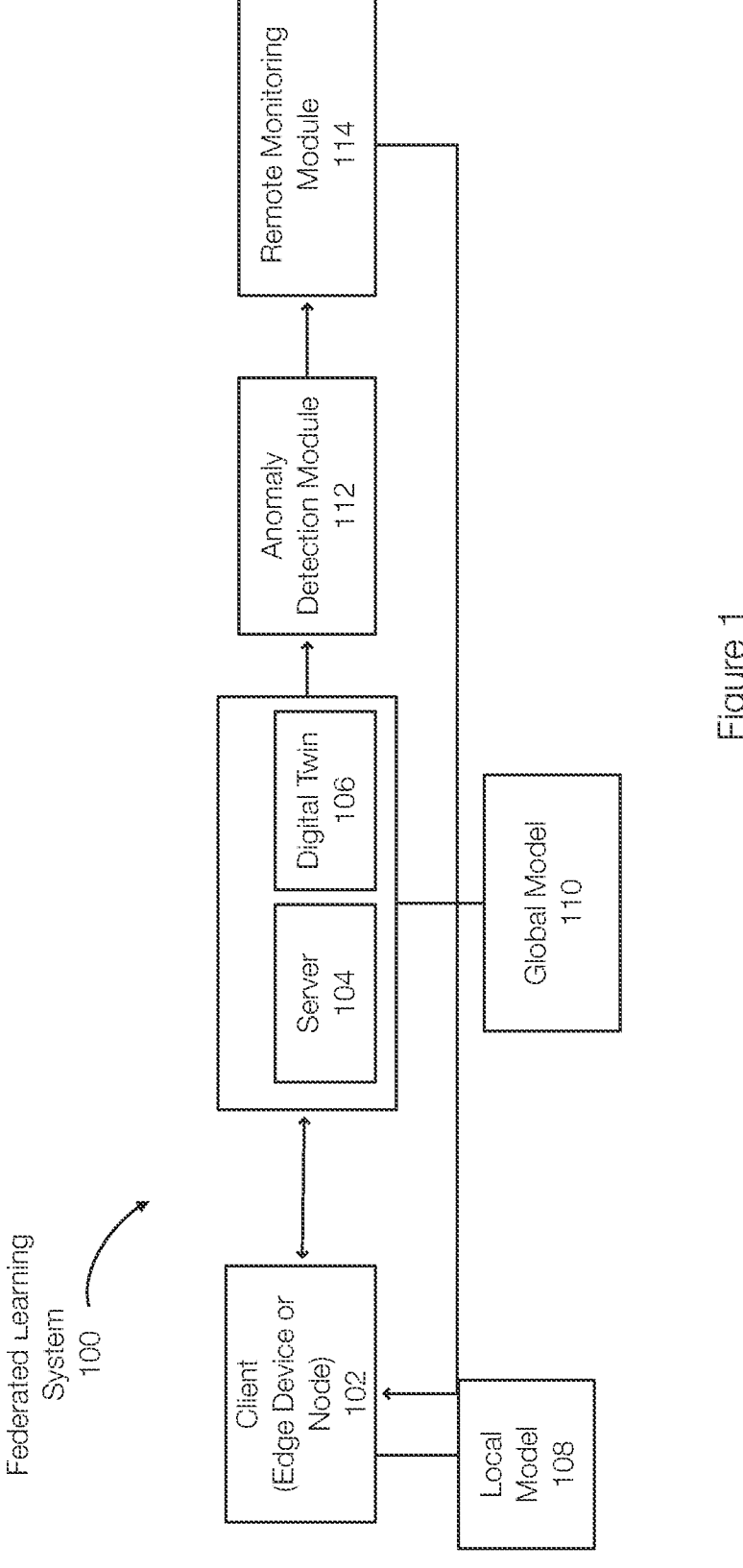
FIG. 1 discloses aspects of anomaly detection in a computing system such as a federated learning system.

Embodiments of the present invention generally relate to digital twins and to monitoring computing systems and environments with digital twins. More particularly, at least some embodiments of the invention relate to systems, hardware, software, computer-readable media, and methods for monitoring for server attacks in federated learning environments.

The Industrial Internet of Things (IIoT) is basically an extension of the Internet of Things (IoT) to industrial applications. When performing operations, a lot of data may be transmitted over various networks in the context of IIoT. As a result, there is a strong incentive to minimize the privacy and security risks associated with data transmission.

Data transmission often occurs in the context of federated learning, which is often implemented using a client-server architecture. A federated learning environment often includes multiple clients. In federated learning, each client (e.g., node) in the federated learning system may train a model locally using local data. Each of the clients shares their locally trained model (or updates to their local models such as gradients) with a central server. The central server may aggregate the updates received from the clients into a global model (or global update), update the global model and synchronize the global model (or the global update)

back to the clients. This process may be performed iteratively until, for example, the global model converges.

The federated learning protocol may be vulnerable to attack and is associated with security risks. For example, the central server is a focal point of federated learning and may be viewed as a weak point and vulnerable to attack. If compromised, a malicious server could, for example, change the central aggregation step, disregard updates from certain clients and/or add noise/disturbances to the global model. Security risks also include using local updates to extract sensitive information from clients. These types of malicious actions can damage the entire federation learning system and waste applied resources, which results in unwanted costs and decreased confidence for customers.

Embodiments of the invention integrate digital twins (DTs) with servers to monitor computing systems such as federated learning systems for these types of attacks and to protect the federated learning system from these types of attacks.

A digital twin can be configured or constructed to be a digital representation of devices, servers, or of an entire network and allows embodiments of the invention to improve security and data privacy issues in systems including federated learning systems. In addition to providing reliability metrics for updates sent by physical devices, digital twins can be used to identify reliable and energy efficient network traffic communication, assist in determining the allocation of resources in a reconfigurable network, and to provide real-time network traffic flow prediction. In embodiments of the invention, digital twins may be configured to learn historical patterns, detect suspicious or anomalous behavior, and simulate behavior and events of network entities in real time or near real time.

Embodiments of the invention integrate a digital twin with a federated learning system (more specifically with a central server) to provide robust model verification, based on real-time monitoring of the central server (or servers) in a federated computing system, so that the effects of server attacks can be reduced or minimized.

Digital twins may be used to monitor network aspects of federated learning environments. In one example, each client in the federated system will be assigned or associated with a belief or reputation score, which may be used at least while aggregating updates from the local models. The belief score may be used to protect against attacks such as model poisoning attacks.

Embodiments of the invention relate to a digital twin that is configured to monitor federated learning systems, including servers, provide a robust aggregation model verification, detect malicious server or client behaviors, and the like. Integrating digital twins with federated learning can help preserve and maintain the security of a system, such as a federated learning system, and may protect the privacy of data clients, monitor server and/or node behavior, or the like. Embodiments of the invention more specifically relate to digital twins for real-time server monitoring in, by way of example, federated learning systems and environments. Malicious server or client behavior may be detected, by way of example, while training a global machine learning model.

Embodiments of the invention generate or construct a digital twin that is integrated or intertwined with a central server in a manner that allows data to be continually exchanged in one example between the server and the digital twin. This ensures that the digital twin has all of the data or information needed to obtain the global model of each learning round. Integrating a digital twin module with a central server provides a protection layer against at least server attacks in a federated learning environment.

In one example, the digital twin may be configured to provide or determine a probability distribution of acceptable values for each update sent from the server to the clients of the federated learning system. This distribution determined by the digital twin allows malicious or potentially malicious updates to be identified. More specifically, in some examples, a robust distribution of acceptable server updates variability is calculated in a manner that includes information related to or probabilities of communication failures. To obtain this information, changes that come from the network itself may be considered.

In one example, each piece of information (e.g., data, object, update, gradient) transmitted has a certain probability of change resulting from communication failures (and consequently a probability that the data does not contain errors). In one example, each sent gradient is modeled as a list of random variables, one per gradient dimension (a gradient element), each following an independent normal distribution, where the average may be the gradient element value received by the digital twin. The standard deviation may be given by the product between the standard deviation of each gradient element across clients, and the probability a failure did not occur during the transmission. To ensure that the final value is not null in one example, the result may be summed by or with a small epsilon value.

When assuming that these gradient elements are independent, the aggregated value of each random variable is given by the average of normally distributed random variables, which is itself another normally distributed random variable. Thus, for each gradient element, a mean (distribution's mean) and a confidence score (final distribution's standard deviation) can be determined.

Embodiments of the invention use a digital twin to monitor and detect deviations in the aggregation of local models performed on the server, calculate an acceptable variability for each gradient, and identify possible malicious or suspicious updates. This allows a server attack to be identified and corrective actions to be taken. Embodiments of the invention improve the security and integrity of gradients received from the local models and the updates sent by the central server.

In the context of monitoring network aspects of a federated learning system with a digital twin, a reputation metric for each node or client may be established. The reputation metric may be used as weighing importance in aggregating the model updates. The reputation metric is determined using deviations between the responses provided by the digital twin and the responses of the physical clients, the number of positive and suspicious interactions between the client and the server, the quality of local learning, and the probability of failure in the data transmission process.

As the deviation increases, the belief in the associated node decreases. Thus, updates received from nodes with higher reputation metrics should have greater weight or influence in the aggregations as they are more unlikely to be threats or attacks.

The belief b of a node i in a timeslot t can be expressed as follows:

$$b_i^t = \frac{(1 - u_i^t)q_i^t}{\hat{f}_i(t)} \cdot \frac{\alpha_i^t}{\alpha_i^t + \beta_i^t}. \qquad \text{(equation 1)}$$

In this example, $\hat{f}_i(t)$ corresponds to the digital twin deviation for the node i, $$\alpha_i^t$$

is a number of positive interactions, $$\beta_i^t$$

is a number of malicious actions such as uploading lazy data, $$q_i^t$$

denotes a quality of learning based on an honesty of most training devices.

The reputation value for the node i may be expressed as:

$$R_i = \sum_{t=1}^{N_t} b_i^t + \iota u_i^t. \qquad \text{(equation 2)}$$

In this example, $\iota \in [0,1]$ is a coefficient indicating a degree of uncertainty affecting the reputation and $$u_i^t$$

represents a failure probability of packet transmission. In each global round, the reputation values are updated and the local models $$w_i^k$$

of the participating nodes are aggregated into a weighted local model as follows:

$$w_i^k = \frac{\sum_{i=1}^{N_d} \sum_{t=1}^{N_t} R_i w_i^t}{\sum_{i=1}^{N_d} R_i}. \qquad \text{(equation 3)}$$

In this example, $w_k$ represents the global parameter after the k-th global aggregation and $N_d$ is the number of training devices. The foregoing equations 1, 2, and 3 relate to trust-based aggregation, more fully described in Sun, Wen, et al. "Adaptive federated learning and digital twin for industrial internet of things." *IEEE Transactions on Industrial Informatics* 17.8 (2020): 5605-5614, which is incorporated by reference in its entirety.

Aspects of a belief score in the context of trust-based aggregation are discussed and/or incorporated in the context of monitoring a federated learning system for server attacks or other anomalies or suspicious behavior.

FIG. 1 discloses aspects of a federated system integrated or intertwined with a digital twin configured to monitor the server and/or the clients. FIG. 1 illustrates a federated learning system 100 that includes multiple clients, represented by client 102, and one or more servers, represented as a server 104. The client 102 may train a local model 108 using local data. Updates (e.g., gradients) to the local model 108 are transmitted to the server 104 from each of the clients in the system 100. The server 104 aggregates updates from all of the clients to generate a global update that is applied to the global model 110. The global model 110 (or a global update) may be distributed back to the edge devices. This cycle may repeat until the model is sufficiently trained. The client 102 and the server 104 may each include a processor, memory of one or more types, network hardware, and the like.

The federated learning system 100 also includes or is associated with a digital twin 106. More specifically in one example, the digital twin 106 is configured or constructed as a digital twin of the server 104. The digital twin 106 is thus a virtual or digital representation of the server 104 and is aware of the applied aggregation method, the probability of packet transmission failure for each client 102 in the system 100, real-time updates of local models, and the final model (or updates) transmitted by the server 104 back to the edge device 102.

This information allows the digital twin 106 to monitor the server 104 and provide, for each state of the server 104, the expected behavior according to the data that has been received. In one example, the server 104 and the digital twin 106 are intertwined and exchange data continuously.

An anomaly detection module 112 is configured to detect anomalies in the server 104 and the remote monitoring module 114 is configured to interact with the client 102.

Once the digital twin 106 is created and operating, the digital twin 106 will transmit, in one example, the average values and variance of the global model parameters estimated by the server 104 to the federation clients, represented by the client 102. In one example, a distribution may be transmitted to the client 102. A confidence interval of the distribution may be based on two types of information in one example: (i) local updates sent by clients and (ii) probabilities $b_{i^x}$ of non-malicious failures occurring during communication in the client data transmission. Thus, for each piece of information transmitted, a defined probability of change resulting from communication failures and a probability that the data does not contain errors is obtained.

In one example, there are T clients in a federation. Each gradient i is modeled as a list of random variables $G_i = \{G_{i^1}, \ldots, G_{i^T}\}$. In this example, each element represents the estimated update on training of a federation client. In this example, $b_i$ is the probability that a communication failure has not occurred during the transmission of the update to the server 104 and/or the digital twin 106.

In one example, each gradient obtained by locally training a model from a client x as obtained i. i. d. (independent and identically distributed random variables) from a normal distribution as follows:

$$\bar{G}_{i^x} \sim \mathcal{N}(\mu_{i^x}, \theta_{i^x}^2).$$

In this example, the average $\mu_{i^x}$ will be the gradient element $G_{i^x}$ received by the digital twin 106 from the client x and the standard deviation $\theta_{i^x}$ will be given by the product between the standard deviation $\theta_i$ of the gradient i across all client gradients, and the probability $b_{i^x}$ of not having a failure during this transmission. To ensure that the final value is not degenerate or null, the result is summed with a small value $\epsilon$.

Given the independence between gradient elements, the final aggregate gradient value for the digital twin 106 is a weighted average of normal distributions in one example, which is itself another normal distribution as follows:

$$\bar{G}_t \sim \mathcal{N}(\mu_i, \theta_i^2).$$

This indicates that for each gradient element, a mean (distribution's mean) and a confidence score (final distribution's standard deviation) is obtained. By applying an averaging algorithm, the mean and variance of the new aggregate normal distribution $\bar{G}_l$ is:

$$\mu_i = \sum_{x=1}^{T} \frac{n_x}{n} \mu_{i^x} \text{ and } \sigma_i = \sum_{x=1}^{T} \frac{n_x}{n} \sigma_{i^x}.$$

In this example, $n_x$ is the number of samples used in training the client x and n is the total number of samples used in the current round. Once the digital twin 106 is constructed, the belief score can be estimated.

More specifically, aspects of monitoring the server 104 and/or the clients may include various phase that include: (i) performing federated training, (ii) real-time communication of server updates to the digital twin, and (iii) anomalous behavior detection using belief distributions. These distributions, in effect, allow the digital twin to identify which gradients are believable and which are not believable.

Figure 2A:
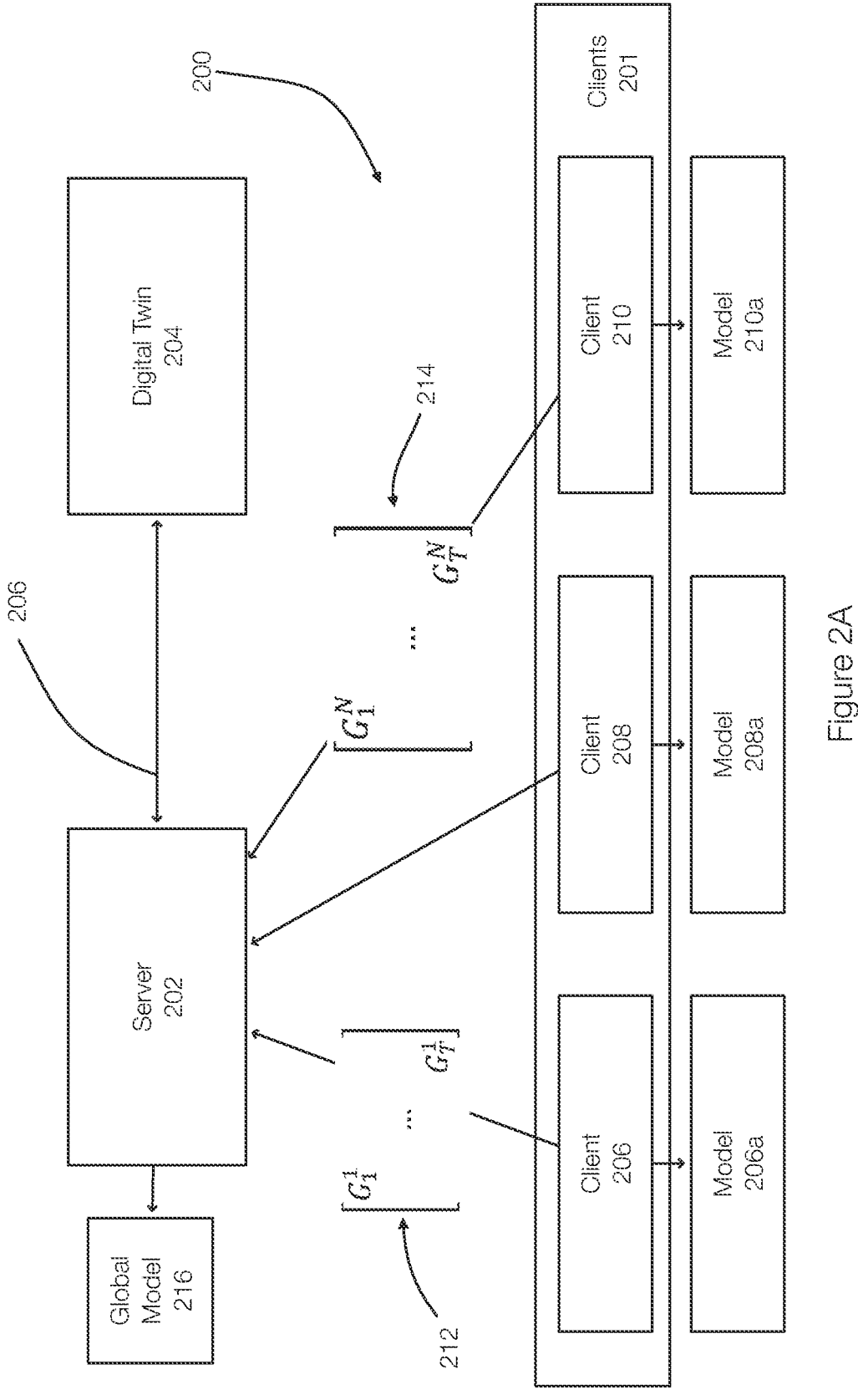
FIG. 2A discloses aspects of integrating a digital twin with a central server or with federated learning.

FIG. 2A discloses aspects of training a model in a federated learning system. In this example, the federated learning system 200 includes a server 202 that cooperates with clients 201, represented as clients 206, 208, and 210, to perform federated learning. The clients 206, 208, and 210 train their respective models 206a, 208a, and 210a.

After the clients 206, 208, and 210 train their respective models 206a, 208a, and 210a with local data in one example, their respective gradients (or gradient updates) are transmitted to the server 202 and subsequently to the digital twin 204. The gradients 212 represent the gradients provided by the client 206 and the gradients 214 represent the gradients provided by the client 210.

Figure 2B:
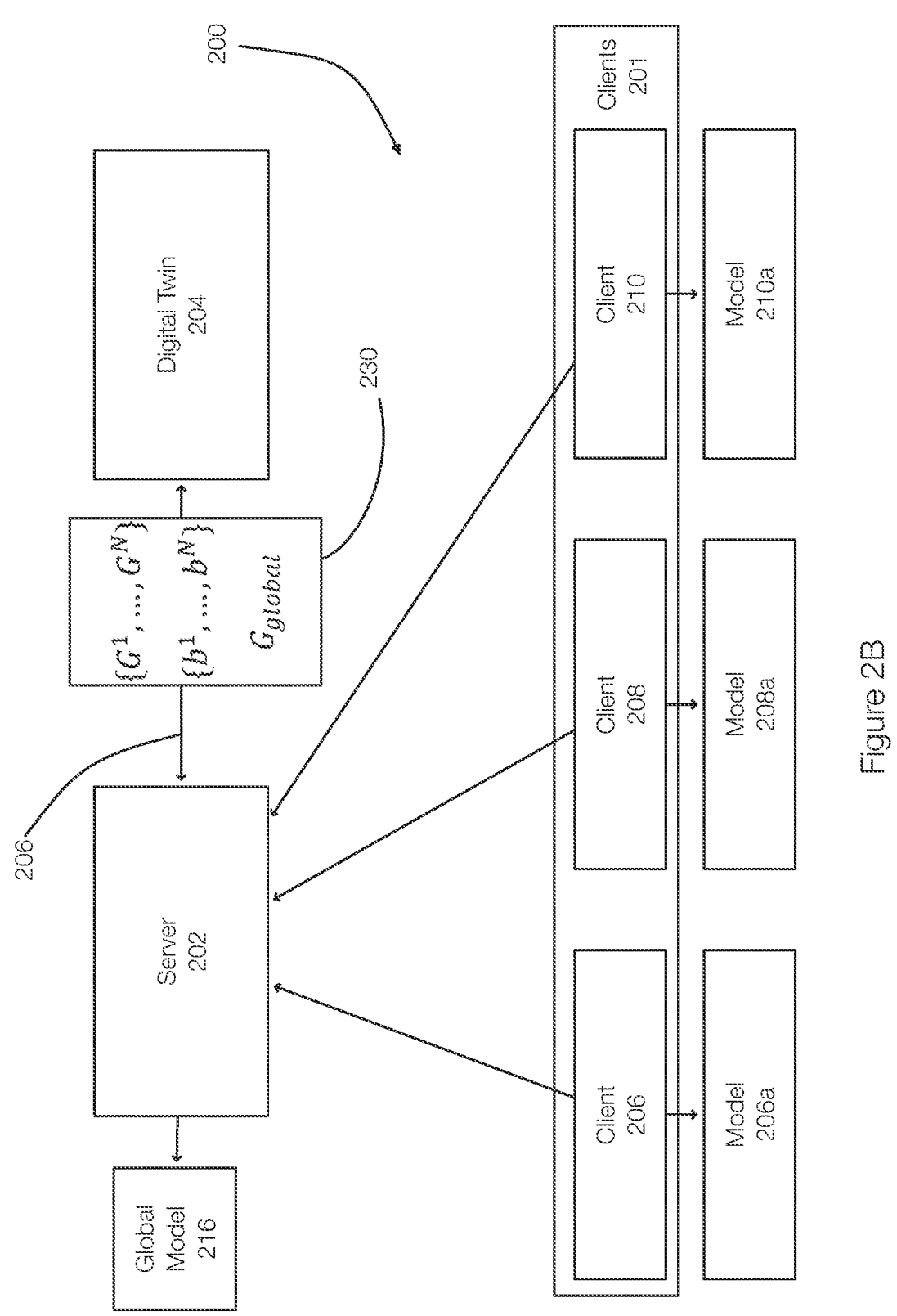
FIG. 2B discloses additional aspects of integrating a digital twin with a federated learning system including communications with the digital twin.

FIG. 2B discloses aspects of communications between a server of a federated learning system and a digital twin. After the server 202 receives local gradients (or updates) from the clients 201, the data or information 230 are shared with the digital twin 204. More specifically, the information 230 communicated to the digital twin 204 includes the gradients (or updates) received from each of the clients 206, 208, and 210 (e.g., clients 1 . . . T), belief values for the clients 206, 208, and 210, and the global model. In this example, the belief values includes at least a probability that a transmission failure did not occur.

Using the information 230, the digital twin 204 is configured to determine distributions that describe an acceptable variability of the gradient values. Once probability distributions are obtained, describing the variability of the gradients, anomalous behavior may be detected in at least two different ways. First, the anomaly detection module 112 (see FIG. 1) may execute on the digital twin 204. Second, a remote monitoring module 114 (see FIG. 1) may execute on the clients 206, 208, and 210. In one example, the remote monitoring module 114 is similar to the anomaly detection module 112, but operates on the client 102. Stated differently, anomalies can be detected at the digital twin 204 and/or at the clients 206, 208 and 210. Determining whether a gradient is within a specified confidence interval includes determining the variance in one example of the distribution.

Figure 2C:
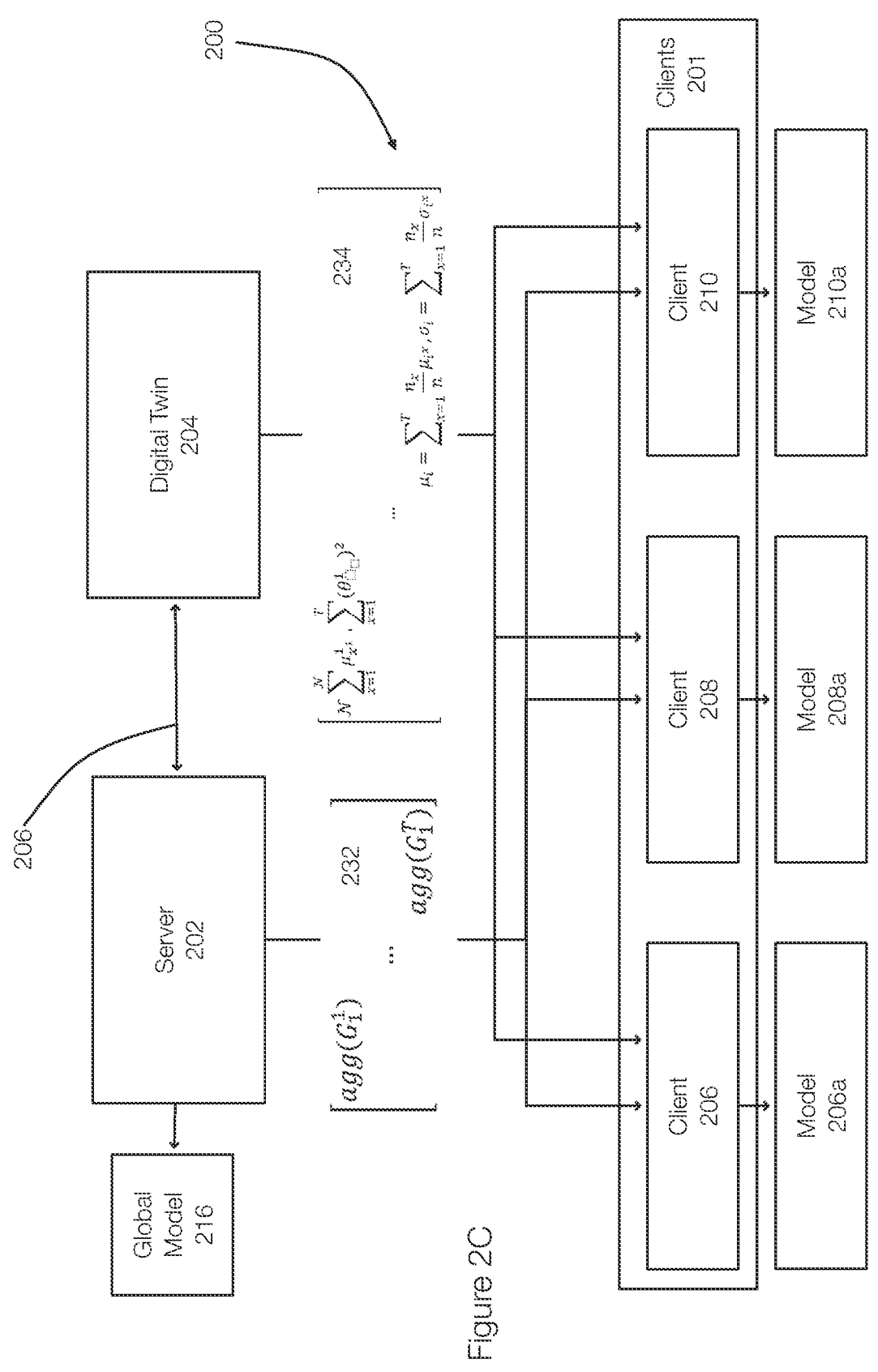
FIG. 2C discloses aspects of detecting anomalous activity in a federated learning system using a digital twin.

FIG. 2C discloses aspects of distributing global updates (or the global model) and distributions to the clients 201. In FIG. 2C, anomalous behavior is detected at the server 202 (or digital twin 204 using distributions 234), although anomalous behavior may also be detected at the clients 206, 208, and 210 using the distributions 234, which includes in one example, the mean and variance of the aggregate normal distribution, where M represents the total number of gradients. The mean and variance of the aggregate normal distribution are provided to the clients 201 and the clients 201 can each determine whether the global updates sent by the server 202 are anomalous.

Figure 2D:
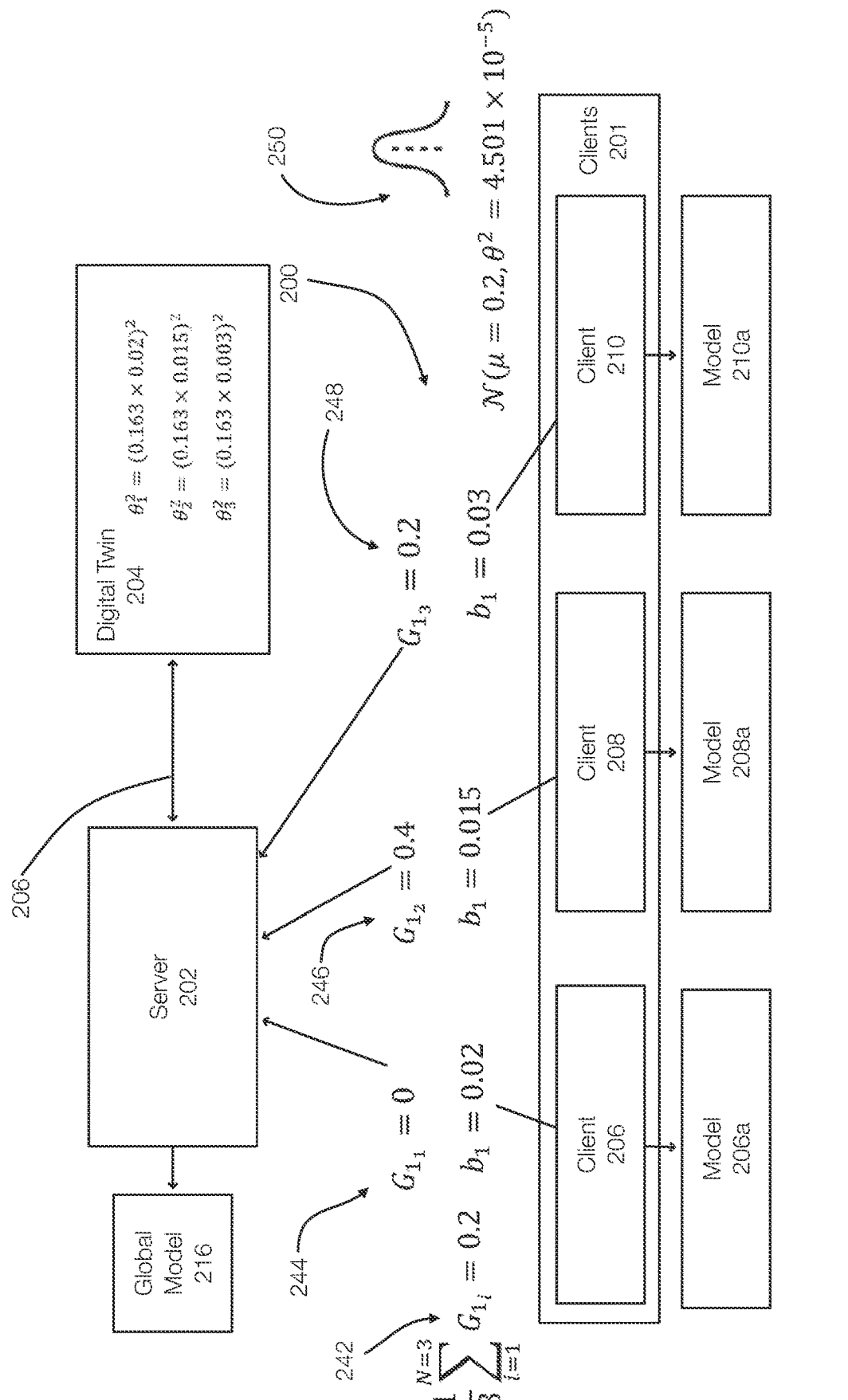
FIG. 2D discloses additional aspects of detecting anomalous activity in a federated learning system using a digital twin.

FIG. 2D discloses additional aspects of monitoring for attacks in a federated learning system. FIG. 2D illustrates an example of detecting anomalies in a federated learning system. In FIG. 2D, each of the clients 206, 208, and 210 sends gradients (or updates) obtained in their respective local training to the server 202. The clients 206, 208, and 210 also each share a belief score with the server 202. For simplicity, the example of FIG. 2D includes a single gradient. Thus, the client 206 sends information 244 (e.g., gradients and a belief score), the client 208 sends information 246, and the client 210 sends information 248. The belief score included in the information 244, 246, and 248 may include the probability of not having communication failures on each channel.

Using these updates, the server 202 determines an aggregated gradient for each element by applying a federated average algorithm 242. Thus, the average gradient in this example is 0.2. The information received by the server 202 is shared with the digital twin 204.

The digital twin 204 calculates the acceptability distributions of each gradient sent by the clients and applies the same aggregation method applied by the server 202. With these data, the global update and the acceptability distributions, tests or other algorithms may be applied to detect anomalous behavior at the digital twin 204 and/or at the clients.

In FIG. 2D, the distribution 250 illustrates that the mean is 0.2 and the variance is $4.510*10^{-5}$. This distribution and the variance, which variance may be used to define a confidence interval around the mean, allows anomalous gradients (e.g., those outside the confidence interval) to be identified. As a result, corrective action can be taken at the server, at the clients, or the like.

Figure 3:
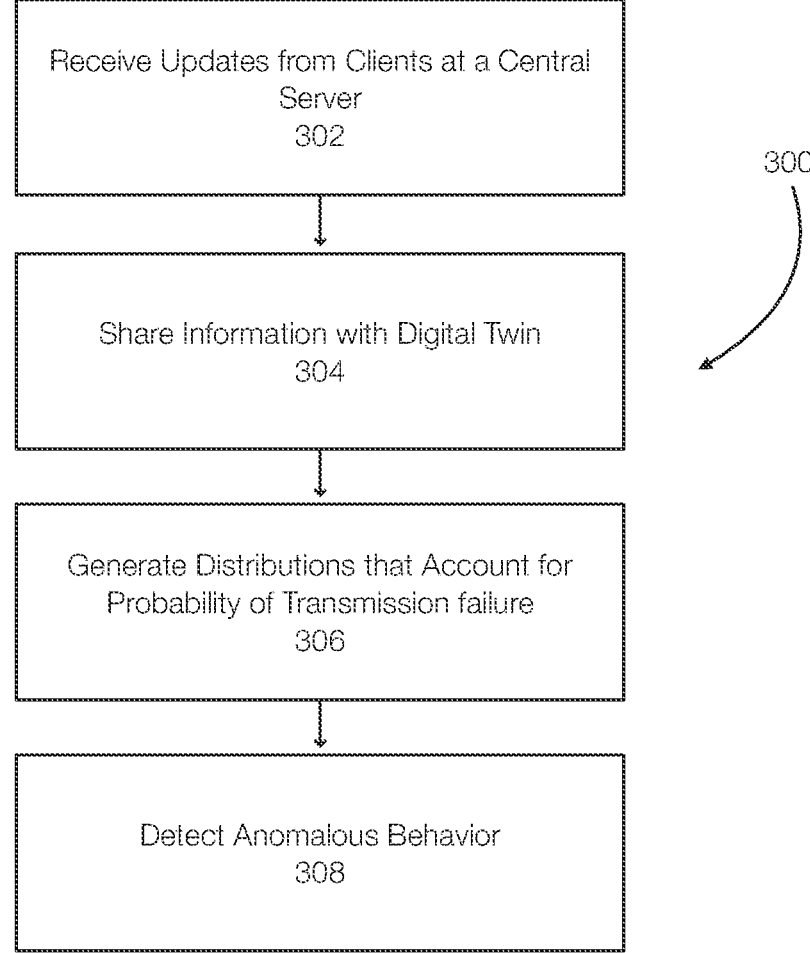
FIG. 3 discloses aspects of a method for monitoring a federated learning system.

FIG. 3 discloses aspects of a method for detecting anomalous behaviors using distributions based on the updates. The method 300 includes receiving 302 information from each of the multiple clients in a federated learning system at a central server. The information from each of the clients may include updates such as gradient updates and probabilities of transmission failure. The probability, in one example, is a probability of non-malicious failure in the communication. More specifically, the probability is a probability of change resulting from communication failures. This also represents a probability that the data does not contain errors.

This information is shared 304 with a digital twin. The digital twin then emulates the server by performing some of the same operations. The digital twin, for example, may aggregate the gradients and perform the same or similar operations as performed by the central server. In addition, the digital twin may generate distributions that describe the variability of the gradients. When generating the distribution, the standard deviation for the distribution $\theta_{i^x}$ is a product of the standard deviation $\theta_i$ of the gradient i across all client gradients and the probability $b_{i^x}$ of not having occurred a failure during transmission. More specifically, this standard deviation represents the standard deviation of each gradient obtained by local training of a model from a client x. The standard deviation related with the final aggregate distribution computed in the digital twin 204 is, in one example, a mean of all the standard deviations of the clients. In these standard deviations, the probability of transmission failure is represented in the distribution and its variability.

The digital twin can generate 306 probability distributions that account for the probability that transmission failure occurred (or did not occur). In one example, the server may calculate the aggregated or global gradient using a federated average algorithm. The digital twin will generate or calculate the acceptability distributions of each gradient sent by the clients and will apply the same aggregation method applied by the server.

Using the global update and the acceptability distribution, anomalous behavior can be detected 308 at the digital twin, and/or the clients. Corrective action may also be performed as necessary. More specifically, the distribution allows anomalies in the global gradient or the global gradient update to be detected. Corrective action, which may include terminating the federated learning operation in which the clients and the central server are participating.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, attack detection operations, scoring operations, distribution determination operations, digital twin operations, anomaly detection operations, federated learning attack monitoring operations, or the like. More generally, the scope of the invention embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a data-center which is operable to perform operations, including federated learning, attack monitoring operations, initiated by one or more clients or other elements of the operating environment.

Example cloud computing environments, which may or may not be public, include storage environments that may provide data storage functionality for one or more clients.

Another example of a cloud computing environment is one in which processing, data protection, federated learning, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating data and that are capable of training and operating machine learning models. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data storage system components such as databases, storage servers, storage volumes (LUNs), storage disks, services, backup servers, servers, and clients, for example, may likewise take the form of software, physical machines, containers, or virtual machines (VM), though no particular component implementation is required for any embodiment.

Example embodiments of the invention are applicable to any system capable of storing and handling various types of objects, in analog, digital, or other form. Rather, such principles are equally applicable to any object capable of representing information.

It is noted with respect to the disclosed methods that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: receiving local updates at a central server from clients that are each associated with a local model, wherein the local updates include local gradients and a belief score, communicating the updates to a digital twin of the central server, generating a distribution using the updates and a global update, the global update including global gradient update to be sent to the clients, determining whether the global update is anomalous based on the distribution, and performing a corrective action when any anomaly is observed in the global gradient update.

Embodiment 2. The method of embodiment 1, wherein the belief score includes a probability of transmission failure related to transmitting an update.

Embodiment 3. The method of embodiment 1 and/or 2, further comprising modeling each gradient as a list of random variables.

Embodiment 4. The method of embodiment 1, 2, and/or 3, further comprising modelling each gradient obtained by local training as obtained from a normal distribution $$\hat{G}_{i^x} \sim \mathcal{N}(\mu_{i^x},\ \theta_{i^x}^2),$$

wherein an average $\mu_{i^x}$ is a gradient element $G_{i^x}$ received by the digital twin and a standard deviation $\theta_{i^x}$ will be given by the product between the standard deviation $\theta_i$ of the gradient i across all client gradients, wherein the belief score is a probability $b_{i^x}$ of not having a failure during this transmission.

Embodiment 5. The method of embodiment 1, 2, 3, and/or 4, wherein a final aggregate gradient value is a weighted average of normal distributions, wherein the weighted average of normal distributions is a normal distribution $\overline{G} \sim \mathcal{N}(\mu_i,\ \theta_i^2)$.

Embodiment 6. The method of embodiment 1, 2, 3, 4, and/or 5, further comprising determining a standard deviation that is a product between a standard deviation of a gradient across all client gradients and the belief score.

Embodiment 7. The method of embodiment 1, 2, 3, 4, 5, and/or 6, further comprising determining an acceptability distribution for each of the gradients.

Embodiment 8. The method of embodiment 1, 2, 3, 4, 5, 6, and/or 7, further comprising determining a mean and a variance for the acceptability distributions.

Embodiment 9. The method of embodiment 1, 2, 3, 4, 5, 6, 7, and/or 8, further comprising identifying anomalous gradients based on the mean and the variance, wherein anomalous gradients are gradients outside of a confidence interval defined by the variance.

Embodiment 10. The method of embodiment 1, 2, 3, 4, 5, 6, 7, 8, and/or 9, wherein the corrective actions include stopping a federated learning operation in which the clients and the central server are participating.

Embodiment 11. The method as recited in any of embodiments 1-10 or any combination thereof.

Embodiment 12 A system, comprising hardware and/or software, operable to perform any of the operations, methods, or processes, or any portion of any of these, disclosed herein.

Embodiment 13 A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term, module, component, client, engine, service, agent, or the like may refer to software objects or routines that execute on the computing system. These may be implemented as objects or processes that execute on the computing system, for example, as separate threads or as hardware. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
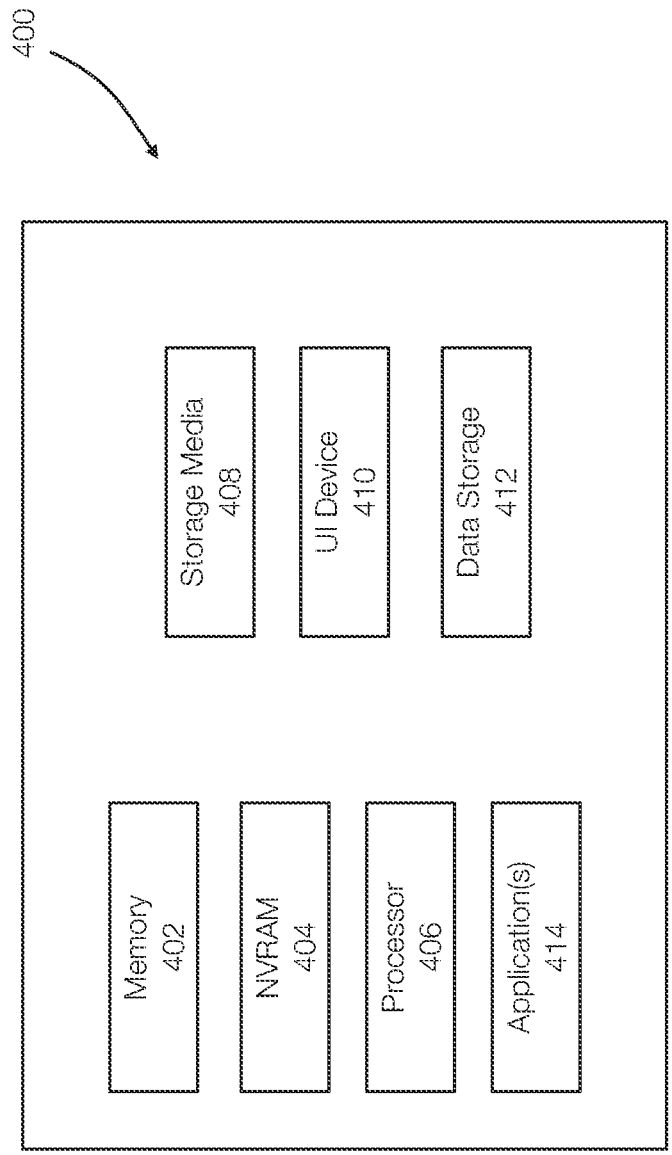
FIG. 4 discloses aspects of a computing device, system, or entity.

With reference briefly now to FIG. 4, any one or more of the entities disclosed, or implied, the FIGURES, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving local updates at a central server from clients that are each associated with a local model, wherein the local updates include local gradients and a belief score;
communicating the local updates to a digital twin of the central server;
generating a distribution using the local updates and a global update, the global update including a global gradient update to be sent to the clients;
determining whether the global update is anomalous based on the distribution; and
performing a corrective action when any anomaly is observed in the global gradient update.

2. The method of claim 1, wherein the belief score includes a probability of transmission failure related to transmitting the local updates.

3. The method of claim 1, further comprising modeling each of the local gradients as a list of random variables.

4. The method of claim 1, further comprising modelling each of the local gradients obtained by local training as obtained from a normal distribution $$\tilde{G}_{ix} \sim \mathcal{N}(\mu_{i^x}, \theta_{i^x}^2),$$

wherein an average $\mu_{i^x}$ is a gradient element $G_{i^x}$ received by the digital twin and a standard deviation $\theta_{i^x}$ will be given by the product between the standard deviation $\theta_i$ of the gradient i across all client gradients, wherein the belief score is a probability $b_{i^x}$ of not having a failure during this transmission.

5. The method of claim 4, wherein a final aggregate gradient value is a weighted average of normal distributions, wherein the weighted average of normal distributions is a normal distribution $\overline{G}_i \sim \mathcal{N}(\mu_i, \theta_i^2)$.

6. The method of claim 4, further comprising determining a standard deviation that is a product between a standard deviation of a gradient across all client gradients and the belief score.

7. The method of claim 6, further comprising determining an acceptability distribution for each of the gradients.

8. The method of claim 7, further comprising determining a mean and a variance for the acceptability distributions.

9. The method of claim 8, further comprising identifying anomalous gradients based on the mean and the variance, wherein anomalous gradients are gradients outside of a confidence interval defined by the variance.

10. The method of claim 1, wherein the corrective actions include stopping a federated learning operation in which the clients and the central server are participating.

11. A non-transitory storage medium having stored therein instructions that are executable by one or more hardware processors to perform operations comprising:
receiving local updates at a central server from clients that are each associated with a local model, wherein the local updates include local gradients and a belief score;
communicating the local updates to a digital twin of the central server;
generating a distribution using the local updates and a global update, the global update including a global gradient update to be sent to the clients;
determining whether the global update is anomalous based on the distribution; and
performing a corrective action when any anomaly is observed in the global gradient update.

12. The non-transitory storage medium of claim 11, wherein the belief score includes a probability of transmission failure related to transmitting the local update.

13. The non-transitory storage medium of claim 11, further comprising modeling each of the local gradients as a list of random variables.

14. The non-transitory storage medium of claim 11, further comprising modelling each of the local gradients obtained by local training as obtained from a normal distribution $$\tilde{G}_{ix} \sim \mathcal{N}(\mu_{i^x}, \theta_{i^x}^2),$$

wherein an average $\mu_{i^x}$ is a gradient element $G_{i^x}$ received by the digital twin and a standard deviation $\theta_{i^x}$ will be given by the product between the standard deviation $\theta_i$ of the gradient i across all client gradients, wherein the belief score is a probability $b_{i^x}$ of not having a failure during this transmission.

15. The non-transitory storage medium of claim 14, wherein a final aggregate gradient value is a weighted average of normal distributions, wherein the weighted average of normal distributions is a normal distribution $\overline{G}_i \sim \mathcal{N}(\mu_i, \theta_i^2)$.

16. The non-transitory storage medium of claim 14, further comprising determining a standard deviation that is a product between a standard deviation of a gradient across all client gradients and the belief score.

17. The non-transitory storage medium of claim 16, further comprising determining an acceptability distribution for each of the gradients.

18. The non-transitory storage medium of claim 17, further comprising determining a mean and a variance for the acceptability distributions.

19. The non-transitory storage medium of claim 18, further comprising identifying anomalous gradients based on the mean and the variance, wherein anomalous gradients are gradients outside of a confidence interval defined by the variance.

20. The non-transitory storage medium of claim 11, wherein the corrective actions include stopping a federated learning operation in which the clients and the central server are participating.

* * * * *